United States Patent
Mizumura et al.

(10) Patent No.: US 10,946,615 B2
(45) Date of Patent: *Mar. 16, 2021

(54) COLORING COMPOSITION, DICHROIC DYE COMPOUND, LIGHT ABSORPTION ANISOTROPIC FILM, LAMINATE, AND IMAGE DISPLAY DEVICE

(71) Applicant: FUJIFILM Corporation, Tokyo (JP)

(72) Inventors: Masatoshi Mizumura, Minami-ashigara (JP); Takashi Katou, Minami-ashigara (JP); Wataru Hoshino, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/124,842

(22) Filed: Sep. 7, 2018

(65) Prior Publication Data

US 2019/0001619 A1 Jan. 3, 2019

Related U.S. Application Data

(63) Continuation of application No. PCT/JP2017/008774, filed on Mar. 6, 2017.

(30) Foreign Application Priority Data

Mar. 8, 2016 (JP) .............................. JP2016-044909

(51) Int. Cl.
| | | |
|---|---|---|
| G02F 1/1333 | (2006.01) | |
| B32B 7/02 | (2019.01) | |
| C09K 19/60 | (2006.01) | |
| G02B 5/30 | (2006.01) | |
| C09B 35/037 | (2006.01) | |
| C09K 19/34 | (2006.01) | |
| C09K 19/04 | (2006.01) | |
| G02F 1/1335 | (2006.01) | |

(52) U.S. Cl.
CPC .............. B32B 7/02 (2013.01); C09B 35/037 (2013.01); C09K 19/3497 (2013.01); C09K 19/60 (2013.01); G02B 5/30 (2013.01); G02B 5/3016 (2013.01); *C09K 2019/0448* (2013.01); *C09K 2219/03* (2013.01); *G02F 1/133528* (2013.01); *G02F 2202/043* (2013.01)

(58) Field of Classification Search
CPC ........ B32B 7/02; C09K 19/60; G02B 5/3016; G02F 1/1333; G02F 1/133528; G02F 2202/043
USPC .................................................. 252/299.61
See application file for complete search history.

(56) References Cited

U.S. PATENT DOCUMENTS

| | | | | |
|---|---|---|---|---|
| 6,039,893 | A | * | 3/2000 | Arakawa ............... C09K 19/601 252/299.01 |
| 7,857,991 | B2 | * | 12/2010 | Shiga .................. C09B 67/0055 252/299.01 |
| 2005/0139123 | A1 | | 6/2005 | Fujiwara |
| 2009/0033861 | A1 | | 2/2009 | Shiga et al. |
| 2013/0070899 | A1 | | 3/2013 | Morishima et al. |
| 2013/0107195 | A1 | | 5/2013 | Morishima et al. |
| 2013/0234082 | A1 | | 9/2013 | Lee et al. |
| 2014/0124714 | A1 | | 5/2014 | Lee et al. |
| 2014/0126053 | A1 | | 5/2014 | Won et al. |
| 2015/0378068 | A1 | | 12/2015 | Hatanaka |
| 2018/0362768 | A1 | * | 12/2018 | Hoshino ............... C09B 62/475 |

FOREIGN PATENT DOCUMENTS

| | | |
|---|---|---|
| CN | 102822704 A | 12/2012 |
| CN | 102822705 A | 12/2012 |
| CN | 103809233 A | 5/2014 |
| JP | 2005-68265 A | 3/2005 |
| JP | 2008-179670 A | 8/2008 |
| JP | 2013-210624 A | 10/2010 |
| JP | 2011-237513 A | 11/2011 |
| JP | 2012-57046 A | 3/2012 |

(Continued)

OTHER PUBLICATIONS

International Preliminary Report on Patentability and Written Opinion of the International Searching Authority(Forms PCT/IB/326, PCT/IB/373 and PCT/ISA/237), dated Sep. 20, 2018, for International Application No. PCT/JP2017/008774, with an English Translation of the Written Opinion.

(Continued)

*Primary Examiner* — Geraldina Visconti
(74) *Attorney, Agent, or Firm* — Birch, Stewart, Kolasch & Birch, LLP.

(57) ABSTRACT

An object of the invention is to provide a coloring composition which can form a light absorption anisotropic film having an excellent dichroic ratio, a dichroic dye compound, a light absorption anisotropic film, a laminate, and an image display device. A coloring composition according to the invention contains a dichroic dye compound which has a Hansen solubility parameter of 17.5 or greater and has a structure represented by Formula (1), and a liquid crystalline compound.

$$L^1\text{-}A^1\text{-}N\!=\!N\text{-}A^2\text{-}N\!=\!N\text{-}A^3\text{-}L^2 \qquad (1)$$

in Formula (1), $A^1$, $A^2$, and $A^3$ each independently represent a divalent aromatic group which may have a substituent. Any one of $A^1$, $A^2$, and $A^3$ represents a divalent thienothiazole group which may have a substituent. In Formula (1), $L^1$ and $L^2$ each independently represent a substituent.

10 Claims, No Drawings

(56) References Cited

FOREIGN PATENT DOCUMENTS

| JP | 2014-92794 A | 5/2014 |
|---|---|---|
| JP | 2014-95899 A | 5/2014 |
| JP | 2014-189677 A | 10/2014 |
| JP | 2016-4055 A | 1/2016 |
| JP | 2016-27387 A | 2/2016 |

OTHER PUBLICATIONS

International Search Report (PCT/ISA/210), dated Apr. 11, 2017, for corresponding International Application No. PCT/JP2017/008774, with an English translation.
Chinese Office Action and Search Report dated Apr. 2, 2019, for corresponding Chinese Patent Application No. 201780015824.8, with English translation of the Office Action.
Akagi et al, "Syntheses and Properties of Colored Dichroic Dyes Having a Thiazole Skelton", J. Jpn. Soc. Colour Mater., vol. 84, No. 6, 2011, pp. 199-204 with English abstract (6 pages).
Korean Office Action for corresponding Korean Application No. 10-2018-7025421, dated Feb. 11, 2020, with English translation.
Japanese Office Action for corresponding Japanese Application No. 2018-504475, dated Oct. 23, 2019, with English translation.
Chinese Office Action dated Mar. 31, 2020 issued in corresponding CN Application No. 201780015824.8 with English translation.
Chinese Office Action with English translation dated Oct. 28, 2020 for CN Application No. 201780015324.8.
Korean Office Action dated Dec. 2, 2020 for corresponding Application No. 10-2020-7033190 with an English translation.

* cited by examiner

COLORING COMPOSITION, DICHROIC DYE COMPOUND, LIGHT ABSORPTION ANISOTROPIC FILM, LAMINATE, AND IMAGE DISPLAY DEVICE

CROSS-REFERENCE TO RELATED APPLICATIONS

This application is a Continuation of PCT International Application No. PCT/JP2017/008774 filed on Mar. 6, 2017, which claims priority under 35 U.S.C. § 119(a) to Japanese Patent Application No. 2016-044909 filed on Mar. 8, 2016. The above application is hereby expressly incorporated by reference, in its entirety, into the present application.

BACKGROUND OF THE INVENTION

1. Field of the Invention

The present invention relates to a coloring composition, a dichroic dye compound, a light absorption anisotropic film, a laminate, and an image display device.

2. Description of the Related Art

In a case where an attenuation function, a polarization function, a scattering function, or a shielding function is required in relation to irradiated light including laser light and natural light, a device which is operated by a different principle for each function has been used. Therefore, products corresponding to the above-described functions have also been manufactured through a different manufacturing process for each function.

For example, in liquid crystal displays (LCDs), a linearly polarizing plate or a circularly polarizing plate is used to control optical activity or a birefringent property in display. In addition, in organic light emitting diodes (OLEDs), a circularly polarizing plate is also used to prevent external light from being reflected.

Iodine has been widely used as a dichroic substance in these polarizing plates (polarizing elements). However, a polarizing element using an organic dye as a dichroic substance instead of iodine has also been examined.

For example, in JP2011-237513A, "a light absorption anisotropic film including at least one kind of thermotropic liquid crystalline dichroic dye and at least one kind of thermotropic liquid crystalline polymer, in which the mass content of the thermotropic liquid crystalline dichroic dye in the light absorption anisotropic film is 30% or greater" is described (claim 1).

SUMMARY OF THE INVENTION

The inventors have examined the light absorption anisotropic film described in JP2011-237513A, and found that depending on the kind of the dichroic dye compound contained in the coloring composition used for the formation of the light absorption anisotropic film, the alignment degree of the dichroic dye compound contained in the light absorption anisotropic film is reduced, and the dichroic ratio of the light absorption anisotropic film deteriorates.

Accordingly, an object of the invention is to provide a coloring composition with which a light absorption anisotropic film having an excellent dichroic ratio can be formed, a dichroic dye compound, a light absorption anisotropic film, a laminate, and an image display device.

As a result of intensive studies about the above-described object, the inventors have found that a light absorption anisotropic film having an excellent dichroic ratio can be obtained using a coloring composition containing a dichroic dye compound having a specific Hansen solubility parameter and a specific structure, and completed the invention.

That is, the inventors have found that the object can be achieved with the following configuration.

[1] A coloring composition comprising: a dichroic dye compound which has a Hansen solubility parameter of 17.5 or greater and has a structure represented by Formula (1) to be described later; and a liquid crystalline compound.

In Formula (1) to be described later, $A^1$, $A^2$, and $A^3$ each independently represent a divalent aromatic group which may have a substituent. Any one of $A^1$, $A^2$, and $A^3$ represents a divalent thienothiazole group which may have a substituent.

In Formula (1) to be described later, $L^1$ and $L^2$ each independently represent a substituent.

[2] The coloring composition according to [1], in which the structure represented by Formula (1) to be described later is a structure represented by Formula (2) to be described later.

In Formula (2) to be described later, $A^4$ represents a divalent aromatic group which may have a substituent.

In Formula (2) to be described later, $L^3$ and $L^4$ each independently represent a substituent.

In Formula (2) to be described later, E represents any one of a nitrogen atom, an oxygen atom, and a sulfur atom.

In Formula (2) to be described later, $R^1$ represents any one group or atom of a hydrogen atom, a halogen atom, an alkyl group which may have a substituent, and an alkoxy group which may have a substituent.

In Formula (2) to be described later, $R^2$ represents a hydrogen atom or an alkyl group which may have a substituent.

In Formula (2) to be described later, $R^3$ represents a hydrogen atom or a substituent.

In Formula (2) to be described later, n represents 0 or 1. In a case where E is a nitrogen atom, n is 1, and in a case where E is an oxygen atom or a sulfur atom, n is 0.

[3] The coloring composition according to [2], in which in Formula (2) to be described later, $A^4$ is a phenylene group.

[4] The coloring composition according to [2] or [3], in which in Formula (2) to be described later, at least one of $L^3$ or $L^4$ includes a crosslinkable group.

[5] The coloring composition according to any one of [2] to [4], in which in Formula (2) to be described later, both $L^3$ and $L^4$ include a crosslinkable group.

[6] The coloring composition according to [4] or [5], in which the crosslinkable group is an acryloyl group or a methacryloyl group.

[7] The coloring composition according to any one of [1] to [6], in which an absolute value of a difference between a Hansen solubility parameter of the dichroic dye compound and a Hansen solubility parameter of the liquid crystalline compound is greater than 0 and not greater than 4 5 [8] A dichroic dye compound which has a Hansen solubility parameter of 17.5 or greater and has a structure represented by Formula (1) to be described later.

In Formula (1) to be described later, $A^1$, $A^2$, and $A^3$ each independently represent a divalent aromatic group which may have a substituent. Any one of $A^1$, $A^2$, and $A^3$ represents a divalent thienothiazole group which may have a substituent.

In Formula (1) to be described later, $L^1$ and $L^2$ each independently represent a substituent.

[9] The dichroic dye compound according to [8], which has a structure represented by Formula (2) to be described later.

In Formula (2) to be described later, $A^4$ represents a divalent aromatic group which may have a substituent.

In Formula (2) to be described later, $L^3$ and $L^4$ each independently represent a substituent.

In Formula (2) to be described later, E represents any one of a nitrogen atom, an oxygen atom, and a sulfur atom.

In Formula (2) to be described later, $R^1$ represents any one group or atom of a hydrogen atom, a halogen atom, an alkyl group which may have a substituent, and an alkoxy group which may have a substituent.

In Formula (2) to be described later, $R^2$ represents a hydrogen atom or an alkyl group which may have a substituent.

In Formula (2) to be described later, $R^3$ represents a hydrogen atom or a substituent.

In Formula (2) to be described later, n represents 0 or 1. In a case where E is a nitrogen atom, n is 1, and in a case where E is an oxygen atom or a sulfur atom, n is 0.

[10] The dichroic dye compound according to [9], in which in Formula (2) to be described later, $A^4$ is a phenylene group.

[11] The dichroic dye compound according to [9] or [10], in which in Formula (2) to be described later, at least one of $L^3$ or $L^4$ includes a crosslinkable group.

[12] The dichroic dye compound according to any one of [9] to [11], in which in Formula (2) to be described later, both $L^3$ and $L^4$ include a crosslinkable group.

[13] The dichroic dye compound according to [11] or [12], in which the crosslinkable group is an acryloyl group or a methacryloyl group.

[14] A light absorption anisotropic film which is formed using the coloring composition according to any one of [1] to [7].

[15] A laminate comprising: a base; and the light absorption anisotropic film according to [14] which is formed on the base.

[16] The laminate according to [15], further comprising: a λ/4 plate which is formed on the light absorption anisotropic film.

[17] An image display device comprising: the light absorption anisotropic film according to [14]; or the laminate according to [15] or [16].

As described above, according to the invention, it is possible to provide a coloring composition with which a light absorption anisotropic film having an excellent dichroic ratio can be formed, a dichroic dye compound, a light absorption anisotropic film, a laminate, and an image display device.

DESCRIPTION OF THE PREFERRED EMBODIMENTS

Hereinafter, the invention will be described.

The following description of constituent requirements is based on typical embodiments of the invention, but the invention is not limited thereto.

In the invention, a numerical value range expressed using "to" means a range including numerical values before and after "to" as a lower limit value and an upper limit value.

[Coloring Composition]

A coloring composition according to the invention contains: a dichroic dye compound having a Hansen solubility parameter (hereinafter, also simply referred to as "HSP value") of 17.5 or greater and a structure represented by Formula (1) to be described later; and a liquid crystalline compound.

According to the coloring composition of the invention, a light absorption anisotropic film having an excellent dichroic ratio can be obtained in a case where a dichroic dye compound having an HSP value of 17.5 or greater and a structure represented by Formula (1) to be described later is contained.

The detailed reason for this is not clear yet, but the inventors have presumed the following reasons.

As will be described later, the structure represented by Formula (1) contains a thienothiazole group. The dichroic dye compound having a thienothiazole group is a compound having an extremely high alignment degree. Accordingly, it is thought that using a dichroic dye compound having a thienothiazole group, a light absorption anisotropic film having a high dichroic ratio can be formed.

However, the inventors have conducted studies about the dichroic dye compound having a thienothiazole group, and found that depending on the kind of the dichroic dye compound having a thienothiazole group, a light absorption anisotropic film to be obtained does not have a sufficient alignment degree, and thus the dichroic ratio is reduced. The detailed reason for this is not clear yet, but presumed to be that in a case where the compatibility between the dichroic dye compound and the liquid crystalline compound contained in the coloring composition is too high, it affects the dichroic ratio of the liquid crystalline compound, and thus the dichroic ratio of the light absorption anisotropic film is reduced.

The inventors have conducted more intensive studies, and found that a light absorption anisotropic film having an excellent dichroic ratio can be obtained using a dichroic dye compound having a thienothiazole group having a specific HSP value. The reason for this is presumed to be that the dichroic dye compound and the liquid crystalline compound are in a good compatible state such as a micro-phase separation state such that a conventional dichroic ratio of the dichroic dye compound can be exhibited.

Hereinafter, components contained in the coloring composition according to the invention and components which can be contained will be described.

<Dichroic Dye Compound>

The coloring composition according to the invention contains a dichroic dye compound having an HSP value of 17.5 or greater and a structure represented by Formula (1) (hereinafter, also referred to as "specific dichroic dye compound").

$$L^1\text{-}A^1\text{-}N\!=\!N\text{-}A^2\text{-}N\!=\!N\text{-}A^3\text{-}L^2 \tag{1}$$

In Formula (1), $A^1$, $A^2$, and $A^3$ each independently represent a divalent aromatic group which may have a substituent. Any one of $A^1$, $A^2$, and $A^3$ represents a divalent thienothiazole group which may have a substituent.

$L^1$ and $L^2$ each independently represent a substituent.

In Formula (1), the "divalent aromatic group which may have a substituent" represented by $A^1$, $A^2$, or $A^3$ will be described.

Examples of the substituent include a substituent group G described in paragraphs [0237] to [0240] of JP2011-237513A, and in the group, a halogen atom, an alkyl group, an alkoxy group, an alkoxycarbonyl group (for example, methoxycarbonyl or ethoxycarbonyl), an aryloxycarbonyl group (for example, phenoxycarbonyl, 4-methylphenoxycarbonyl, or 4-methoxyphenylcarbonyl), or the like is preferable. An alkyl group is more preferable, and an alkyl group having 1 to 5 carbon atoms is even more preferable.

Examples of the divalent aromatic group include a divalent aromatic hydrocarbon group and a divalent aromatic heterocyclic group.

Examples of the divalent aromatic hydrocarbon group include an arylene group having 6 to 12 carbon atoms, and specific examples thereof include a phenylene group, a cumenylene group, a mesitylene group, a tolylene group, and a xylylene group. Among these, a phenylene group is preferable.

As the divalent aromatic heterocyclic group, a monocyclic or bicyclic heterocycle-derived group is preferable. Examples of the atom other than the carbon atom constituting the aromatic heterocyclic group include a nitrogen atom, a sulfur atom, and an oxygen atom. In a case where the aromatic heterocyclic group has a plurality of ring-constituting atoms other than the carbon atom, these may be the same or different. Specific examples of the aromatic heterocyclic group include a pyridylene group (pyridine-diyl group), a quinolylene group (quinoline-diyl group), an isoquinolylene group (isoquinoline-diyl group), a benzothiadiazole-diyl group, a phthalimido-diyl group, and a thienothiazole-diyl group (in the invention, referred to as "thienothiazole group").

Among the divalent aromatic groups, a divalent aromatic hydrocarbon group is preferable.

Here, any one of $A^1$, $A^2$, and $A^3$ is a divalent thienothiazole group which may have a substituent. Specific examples of the substituent of the divalent thienothiazole group are the same as substituents in the above-described "divalent aromatic group which may have a substituent", and their preferable aspects are also the same.

Of $A^1$, $A^2$, and $A^3$, $A^2$ is preferable a divalent thienothiazole group. In this case, $A^1$ and $A^2$ each represent a divalent aromatic group which may have a substituent.

In a case where $A^2$ is a divalent thienothiazole group, it is preferable that at least one $A^1$ or $A^2$ be a divalent aromatic hydrocarbon group which may have a substituent, and it is more preferable that both $A^1$ and $A^2$ be divalent aromatic hydrocarbon groups which may have a substituent.

In Formula (1), the "substituent" represented by L' or $L^2$ will be described.

As the substituent, a group which is introduced to increase the nematic liquid crystallinity or the solubility of an azo compound, an electron-donating or electron-withdrawing group which is introduced to adjust a tone as a dye, or a group having a crosslinkable group (polymerizable group) which is introduced to fix the alignment is preferable.

Examples of the substituent include an alkyl group (preferably having 1 to 20 carbon atoms, more preferably 1 to 12 carbon atoms, and particularly preferably 1 to 8 carbon atoms, exemplified by a methyl group, an ethyl group, an isopropyl group, a tert-butyl group, an n-octyl group, an n-decyl group, an n-hexadecyl group, a cyclopropyl group, a cyclopentyl group, and a cyclohexyl group), an alkenyl group (preferably having 2 to 20 carbon atoms, more preferably 2 to 12 carbon atoms, and particularly preferably 2 to 8 carbon atoms, exemplified by a vinyl group, an allyl group, a 2-butenyl group, and a 3-pentenyl group), an alkynyl group (preferably having 2 to 20 carbon atoms, more preferably 2 to 12 carbon atoms, and particularly preferably 2 to 8 carbon atoms, exemplified by a propargyl group and a 3-pentynyl group), an aryl group (preferably having 6 to 30 carbon atoms, more preferably 6 to 20 carbon atoms, and particularly preferably 6 to 12 carbon atoms, exemplified by a phenyl group, a 2,6-diethylphenyl group, a 3,5-ditrifluoromethylphenyl group, a styryl group, a naphthyl group, and a biphenyl group), a substituted or unsubstituted amino group (preferably having 0 to 20 carbon atoms, more preferably 0 to 10 carbon atoms, and particularly preferably 0 to 6 carbon atoms, exemplified by an unsubstituted amino group, a methylamino group, a dimethylamino group, a diethylamino group, and an anilino group), an alkoxy group (preferably having 1 to 20 carbon atoms, and more preferably 1 to 15 carbon atoms, exemplified by a methoxy group, an ethoxy group, and a butoxy group), an oxycarbonyl group (preferably having 2 to 20 carbon atoms, more preferably 2 to 15 carbon atoms, and particularly preferably 2 to 10 carbon atoms, exemplified by a methoxycarbonyl group, an ethoxycarbonyl group, and a phenoxycarbonyl group), an acyloxy group (preferably having 2 to 20, more preferably 2 to 10 carbon atoms, and particularly preferably 2 to 6 carbon atoms, exemplified by an acetoxy group, a benzoyloxy group, an acryloyl group, and a methacryloyl group), an acylamino group (preferably having 2 to 20 carbon atoms, more preferably 2 to 10 carbon atoms, and particularly preferably 2 to 6 carbon atoms, exemplified by an acetylamino group and a benzoylamino group), an alkoxycarbonylamino group (preferably having 2 to 20 carbon atoms, more preferably 2 to 10 carbon atoms, and particularly preferably 2 to 6 carbon atoms, exemplified by a methoxycarbonylamino group), an aryloxycarbonylamino group (preferably having 7 to 20 carbon atoms, more preferably 7 to 16 carbon atoms, and particularly preferably 7 to 12 carbon atoms, exemplified by a phenyloxycarbonylamino group), a sulfonylamino group (preferably having 1 to 20 carbon atoms, more preferably 1 to 10 carbon atoms, and particularly preferably 1 to 6 carbon atoms, exemplified by a methanesulfonylamino group and a benzenesulfonylamino group), a sulfamoyl group (preferably having 0 to 20 carbon atoms, more preferably 0 to 10 carbon atoms, and particularly preferably 0 to 6 carbon atoms, exemplified by an unsubstituted sulfamoyl group, a methylsulfamoyl group, a dimethylsulfamoyl group, and a phenylsulfamoyl group), a carbamoyl group (preferably having 1 to 20 carbon atoms, more preferably 1 to 10 carbon atoms, and particularly preferably 1 to 6 carbon atoms, exemplified by an unsubstituted carbamoyl group, a methylcarbamoyl group, a diethylcarbamoyl group, and a phenylcarbamoyl group), an alkylthio group (preferably having 1 to 20 carbon atoms, more preferably 1 to 10 carbon atoms, and particularly preferably 1 to 6 carbon atoms, exemplified by a methylthio group and an ethylthio group), an arylthio group (preferably having 6 to 20 carbon atoms, more preferably 6 to 16 carbon atoms, and particularly preferably 6 to 12 carbon atoms, exemplified by a phenylthio group), a sulfonyl group (preferably having 1 to 20 carbon atoms, more preferably 1 to 10 carbon atoms, and particularly preferably 1 to 6 carbon atoms, exemplified by a mesyl group and a tosyl group), a sulfinyl group (preferably having 1 to 20 carbon atoms, more preferably 1 to 10 carbon atoms, and particularly preferably 1 to 6 carbon atoms, exemplified by a methanesulfinyl group and a benzenesulfinyl group), a ureido group (preferably having 1 to 20 carbon atoms, more preferably 1 to 10 carbon atoms, and particularly preferably 1 to 6 carbon atoms, exemplified by an unsubstituted ureido group, a methylureido group, and a phenylureido group), a phosphoric acid amide group (preferably having 1 to 20 carbon atoms, more preferably 1 to 10 carbon atoms, and particularly preferably 1 to 6 carbon atoms, exemplified by a diethylphosphoric acid amide group and a phenylphosphoric acid amide group), a hydroxy group, a mercapto group, a halogen atom (for example, a fluorine atom, a chlorine atom, a bromine atom, and an iodine atom), a cyano group, a nitro group, a hydroxamic group, a sulfino group, a hydrazino group, an imino group, an azo group, a heterocyclic group (preferably having 1 to 30 carbon atoms, and more preferably 1 to 12 carbon atoms, which is a heterocyclic group having heteroatom(s) such as a nitrogen atom, an oxygen atom, and a sulfur atom, and is exemplified by an epoxy group, an oxetanyl group, an imidazolyl group, a pyridyl group, a quinolyl group, a furyl group, a piperidyl group, a morpholino group, a benzoxazolyl group, a benzimidazolyl group, and a benzthiazolyl group), and a silyl group (preferably having 3 to 40 carbon atoms, more preferably 3 to 30 carbon atoms, and particularly preferably 3 to 24 carbon atoms, exemplified by a trimethylsilyl group and a triphenylsilyl group).

Each of these substituents may be further substituted by any of these substituents. In a case where there are two or more substituents, these may be the same or different. If possible, the substituents may combine to form a ring.

The substituent which is represented by $L^1$ or $L^2$ is preferably an alkyl group which may have a substituent, an alkenyl group which may have a substituent, an alkynyl group which may have a substituent, an aryl group which may have a substituent, an alkoxy group which may have a substituent, an oxycarbonyl group which may have a substituent, an acyloxy group which may have a substituent, an acylamino group which may have a substituent, an amino group which may have a substituent, an alkoxycarbonylamino group which may have a substituent, a sulfonylamino group which may have a substituent, a sulfamoyl group which may have a substituent, a carbamoyl group which may have a substituent, an alkylthio group which may have a substituent, a sulfonyl group which may have a substituent, a ureido group which may have a substituent, a nitro group, a hydroxy group, a cyano group, an imino group, an azo group, a halogen atom, or a heterocyclic group, and more preferably an alkyl group which may have a substituent, an alkenyl group which may have a substituent, an aryl group which may have a substituent, an alkoxy group which may have a substituent, an oxycarbonyl group which may have a substituent, an acyloxy group which may have a substituent, an amino group which may have a substituent, a nitro group, an imino group, or an azo group.

It is preferable that at least one of $L^1$ or $L^2$ include a crosslinkable group (polymerizable group), and it is more preferable that both $L^1$ and $L^2$ include a crosslinkable group. Accordingly, the HSP value of the specific dichroic dye compound is easily adjusted to a desired value, or the dichroic ratio of the light absorption anisotropic film can be further improved. In addition, since the curing of the dichroic dye compound itself can be promoted, there is an advantage in that the curability and the durability of the light absorption anisotropic film can be improved.

Specific examples of the crosslinkable group include polymerizable groups described in paragraphs [0040] to [0050] of JP2010-244038A. From the viewpoint of reactivity and synthesis suitability, an acryloyl group, a methacryloyl group, an epoxy group, an oxetanyl group, and a styryl group are preferable, and an acryloyl group and a methacryloyl group are more preferable.

Preferable aspects of $L^1$ and $L^2$ include an alkyl group substituted by the crosslinkable group, a dialkylamino group substituted by the crosslinkable group, and an alkoxy group substituted by the crosslinkable group.

The structure represented by Formula (1) is preferably a structure represented by Formula (2) from the viewpoint of an improvement of the dichroic ratio.

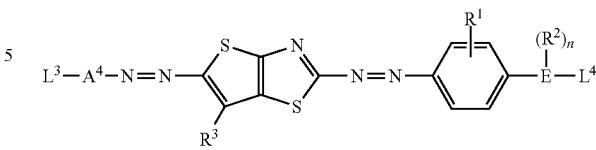

In Formula (2), $A^4$ represents a divalent aromatic group which may have a substituent.

In Formula (2), $L^3$ and $L^4$ each independently represent a substituent.

In Formula (2), E represents any one of a nitrogen atom, an oxygen atom, and a sulfur atom.

In Formula (2), $R^1$ represents any one group or atom of a hydrogen atom, a halogen atom, an alkyl group which may have a substituent, and an alkoxy group which may have a substituent.

In Formula (2), $R^2$ represents a hydrogen atom or an alkyl group which may have a substituent.

In Formula (2), $R^3$ represents a hydrogen atom or a substituent.

In Formula (2), n represents 0 or 1. In a case where E is a nitrogen atom, n is 1, and in a case where E is an oxygen atom or a sulfur atom, n is 0.

In Formula (2), specific examples and preferable aspects of the "divalent aromatic group which may have a substituent" represented by $A^4$ are the same as those of the "divalent aromatic group which may have a substituent" represented by $A^1$, $A^2$, or $A^3$ in Formula (1).

Particularly preferable aspects of $A^4$ include a phenylene group. Accordingly, the HSP value of the specific dichroic dye compound is easily adjusted to a desired value.

In Formula (2), specific examples and preferable aspects of the "substituent" represented by $L^3$ or $L^4$ are the same as those of the "substituent" represented by $L^1$ or $L^2$ in Formula (1).

More preferably, at least one of $L^3$ or $L^4$ includes a crosslinkable group, and even more preferably, both $L^3$ and $L^4$ include a crosslinkable group. Accordingly, the HSP value of the specific dichroic dye compound is easily adjusted to a desired value, or the dichroic ratio of the light absorption anisotropic film can be further improved. In addition, since the curing of the dichroic dye compound itself can be promoted, there is an advantage in that the curability and the durability of the light absorption anisotropic film can be improved.

More preferable aspects of the crosslinkable group of $L^3$ and $L^4$ include an acryloyl group and a methacryloyl group.

In Formula (2), E represents any one atom of a nitrogen atom, an oxygen atom, and a sulfur atom, and from the viewpoint of synthesis suitability, a nitrogen atom is preferable.

E in Formula (1) is preferably an oxygen atom from the viewpoint of the fact that it is easy to make the specific dichroic dye compound have absorption on the short wavelength side (for example, have a maximum absorption wavelength in the vicinity of 500 to 530 nm).

E in Formula (1) is preferably a nitrogen atom from the viewpoint of the fact that it is easy to make the specific dichroic dye compound have absorption on the long wavelength side (for example, have a maximum absorption wavelength in the vicinity of 600 nm).

In Formula (2), $R^1$ represents any one group or atom of a hydrogen atom, a halogen atom, an alkyl group which may have a substituent, and an alkoxy group which may have a substituent, and a hydrogen atom or an alkyl group which may have a substituent is preferable.

Next, the "alkyl group which may have a substituent" and the "alkoxy group which may have a substituent" represented by $R^1$ will be described.

Examples of the substituent include a halogen atom.

Examples of the alkyl group include a linear, branched, or cyclic alkyl group having 1 to 8 carbon atoms. Among these, a linear alkyl group having 1 to 6 carbon atoms is preferable, a linear alkyl group having 1 to 3 carbon atoms is more preferable, and a methyl group or an ethyl group is even more preferable.

Examples of the alkoxy group include an alkoxy group having 1 to 8 carbon atoms. Among these, an alkoxy group having 1 to 6 carbon atoms is preferable, an alkoxy group having 1 to 3 carbon atoms is more preferable, and a methoxy group or an ethoxy group is even more preferable.

In Formula (2), $R^2$ represents a hydrogen atom or an alkyl group which may have a substituent, and an alkyl group which may have a substituent is preferable.

Since specific examples and preferable aspects of the "alkyl group which may have a substituent" represented by $R^2$ are the same as those of the "alkyl group which may have a substituent" represented by $R^1$ in Formula (2), the description thereof will be omitted.

In a case where E is a nitrogen atom, $R^2$ is a group existing in Formula (2) (that is, n=1). In a case where E is an oxygen atom or a sulfur atom, $R^2$ is a group which does not exist in Formula (2) (that is, n=0).

In Formula (2), $R^3$ represents a hydrogen atom or a substituent.

Since specific examples and preferable aspects of the "substituent" represented by $R^3$ are the same as those of the substituent of the "divalent aromatic group which may have a substituent", the description thereof will be omitted.

In Formula (2), n represents 0 or 1. In a case where E is a nitrogen atom, n is 1, and in a case where E is an oxygen atom or a sulfur atom, n is 0.

Hereinafter, specific examples of the specific dichroic dye compound will be shown, but the invention is not limited thereto. The numerical values in parenthesis on the right sides of compounds represented by the following formulae represent HSP values.

(18.1)

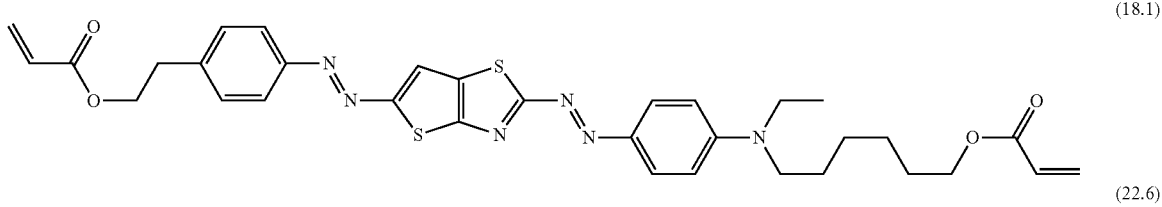

(22.6)

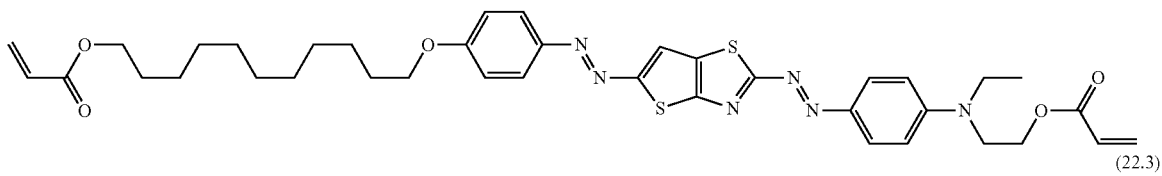

(22.3)

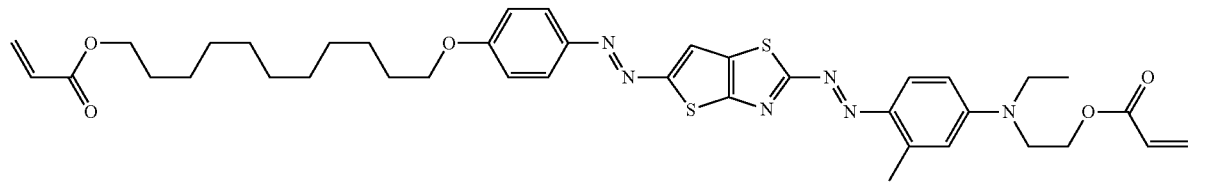

(24.8)

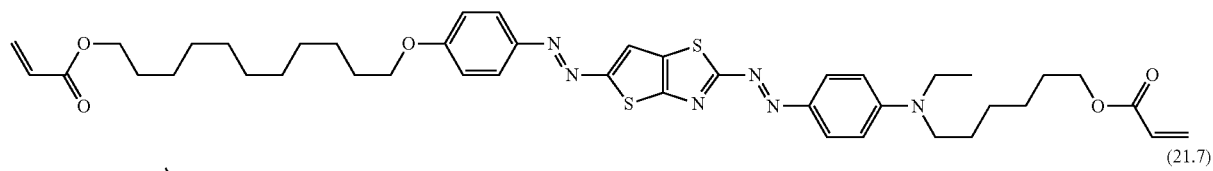

(21.7)

(18.0)

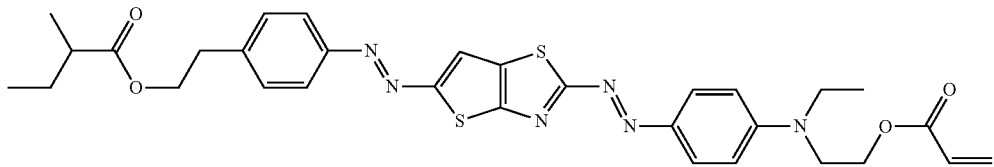

(HSP Value)

The HSP value of the specific dichroic dye compound is 17.5 or greater. The upper limit value of the HSP value is not particularly limited, but generally 26.0 or less.

The HSP value (Hansen solubility parameter) is described in detail in Hansen, Charles (2007), Hansen Solubility Parameters: A user's handbook, Second Edition. Boca Raton, Fla.: CRC Press. ISBN 9780849372483.

In the invention, the HSP value of each compound is calculated by inputting a structural formula of the compound to the following software, and specifically, is a value corresponding to δtotal. As the software, Hansen Solubility Parameters in Practice (HSPiP) ver. 4.1.07 is used.

The absolute value of the difference between the HSP value of the specific dichroic dye compound and the HSP value of the liquid crystalline compound is preferably greater than 0 and not greater than 4.5. The absolute value of the difference between the HSP value of the specific dichroic dye compound and the HSP value of the liquid crystalline compound is more preferably 0.5 to 4.0, and even more preferably 0.9 to 3.6.

The dichroic ratio of the light absorption anisotropic film is further improved in a case where the absolute value of the difference between the HSP value of the specific dichroic dye compound and the HSP value of the liquid crystalline compound is within the above range.

Here, in a case where the coloring composition contains two or more kinds of specific dichroic dye compounds, the HSP value of each of the two or more kinds of specific dichroic dye compounds preferably satisfies the above-described relationship with the HSP value of the liquid crystalline compound.

In addition, in a case where the coloring composition contains two or more kinds of liquid crystalline compounds, the HSP value of each of the two or more kinds of liquid crystalline compounds preferably satisfies the above-described relationship with the HSP value of the specific dichroic dye compound.

In addition, in a case where the coloring composition contains two or more kinds of specific dichroic dye compounds and two or more kinds of liquid crystalline compounds, both the HSP value of each of the two or more kinds of specific dichroic dye compounds and the HSP value of each of the two or more kinds of liquid crystalline compounds preferably satisfy the above-described relationship.

(Content)

The content of the specific dichroic dye compound is preferably 5 to 50 parts by mass, more preferably 10 to 45 parts by mass, and even more preferably 15 to 40 parts by mass with respect to 100 parts by mass of the liquid crystalline compound to be described later.

<Liquid Crystalline Compound>

The coloring composition according to the invention contains a liquid crystalline compound. In a case where the liquid crystalline compound is contained, it is possible to align the dichroic dye compound at a high alignment degree while suppressing the precipitation of the dichroic dye compound.

Any one of a low-molecular-weight liquid crystalline compound and a high-molecular-weight liquid crystalline compound can be used as the liquid crystalline compound. Here, the "low-molecular-weight liquid crystalline compound" refers to a liquid crystalline compound having no repeating unit in the chemical structure. The "high-molecular-weight liquid crystalline compound" refers to a liquid crystalline compound having a repeating unit in the chemical structure.

Examples of the low-molecular-weight liquid crystalline compound include those described in JP2013-228706A.

Examples of the high-molecular-weight liquid crystalline compound include thermotropic liquid crystalline polymers described in JP2011-237513A. In addition, the high-molecular-weight liquid crystalline compound may have a cross-linkable group (for example, an acryloyl group and a methacryloyl group) at the terminal.

The HSP value of the liquid crystalline compound is preferably 18.0 to 30.0, more preferably 20.0 to 28.0, and even more preferably 21.0 to 26.0.

The preferable relationship between the HSP value of the liquid crystalline compound and the HSP value of the specific dichroic dye compound is as described above.

<Solvent>

The coloring composition according to the invention preferably contains a solvent from the viewpoint of workability or the like.

Examples of the solvent include organic solvents such as ketones (for example, acetone, 2-butanone, methyl isobutyl ketone, cyclopentanone, and cyclohexanone), ethers (for example, dioxane and tetrahydrofuran), aliphatic hydrocarbons (for example, hexane), alicyclic hydrocarbons (for example, cyclohexane), aromatic hydrocarbons (for example, benzene, toluene, xylene, and trimethylbenzene), halogenated carbons (for example, dichloromethane, trichloromethane, dichloroethane, dichlorobenzene, and chlorotoluene), esters (for example, methyl acetate, ethyl acetate, and butyl acetate), alcohols (for example, ethanol, isopropanol, butanol, and cyclohexanol), cellosolves (for example, methyl cellosolve, ethyl cellosolve, and 1,2-dimethoxyethane), cellosolve acetates, sulfoxides (for example, dimethyl sulfoxide), amides (for example, dimethylformamide and dimethylacetamide), and heterocyclic compounds (for example, pyridine), and water. These solvents may be used alone or in combination of two or more kinds thereof.

Among these solvents, organic solvents are preferably used, and halogenated carbons or ketones are more preferably used.

In a case where the coloring composition according to the invention contains a solvent, the content of the solvent is preferably 80 to 99 mass %, more preferably 83 to 97 mass %, and even more preferably 85 to 95 mass % with respect to the total mass of the coloring composition.

<Interface Improver>

The coloring composition according to the invention preferably contains an interface improver. Due to the interface improver contained, the smoothness of the coating surface is improved and the alignment degree is improved. Otherwise, cissing and unevenness are suppressed, and thus an improvement in the in-plane uniformity is anticipated.

As the interface improver, a material making the liquid crystalline compound horizontal on the coating surface side is preferable, and compounds (horizontal alignment agents) described in paragraphs [0253] to [0293] of JP2011-237513A can be used.

In a case where the coloring composition according to the invention contains an interface improver, the content of the interface improver is preferably 0.001 to 5 parts by mass, and more preferably 0.01 to 3 parts by mass with respect to a total of 100 parts by mass of the dichroic dye compound and the liquid crystalline compound in the coloring composition.

<Polymerization Initiator>

The coloring composition used in the invention may contain a polymerization initiator.

The polymerization initiator is not particularly limited, and a photosensitive compound, that is, a photopolymerization initiator is preferable.

As the photopolymerization initiator, various kinds of compounds can be used with no particular limitation. Examples of the photopolymerization initiator include α-carbonyl compounds (the specifications of U.S. Pat. Nos. 2,367,661A and 2,367,670A), acyloin ethers (the specification of U.S. Pat. No. 2,448,828A), aromatic acyloin compounds substituted by α-hydrocarbon (the specification of U.S. Pat. No. 2,722,512A), polynuclear quinone compounds (the specifications of U.S. Pat. Nos. 3,046,127A and 2,951,758A), combinations of triarylimidazole dimers and p-aminophenyl ketones (the specification of U.S. Pat. No. 3,549,367A), acridine and phenazine compounds (the specifications of JP1985-105667A (JP-S60-105667A) and U.S. Pat. No. 4,239,850A), oxadiazole compounds (the specification of U.S. Pat. No. 4,212,970A), and acylphosphine oxide compounds (JP1988-40799B (JP-S63-40799B), JP1993-29234B (JP-H5-29234B), JP1998-95788B (JP-H10-95788B), and JP1998-29997B (JP-H10-29997B)).

A commercially available product can also be used as the photopolymerization initiator, and examples thereof include IRGACURE 184, IRGACURE 907, IRGACURE 369, IRGACURE 651, IRGACURE 819, and IRGACURE OXE-01 manufactured by BASF SE.

In a case where the coloring composition according to the invention contains a polymerization initiator, the content of the polymerization initiator is preferably 0.01 to 30 parts by mass, and more preferably 0.1 to 15 parts by mass with respect to a total of 100 parts by mass of the dichroic dye compound and the liquid crystalline compound in the coloring composition. In a case where the content of the polymerization initiator is 0.01 parts by mass or greater, the curability of the light absorption anisotropic film is improved, and in a case where the content of the polymerization initiator is 30 parts by mass or less, the alignment of the light absorption anisotropic film is improved.

<Other Components>

The coloring composition according to the invention may further contain a dichroic dye compound other than the specific dichroic dye compound, or contain a plurality of the specific dichroic dye compounds. In a case where a plurality of dichroic dye compounds are contained, it is preferable that a dichroic dye compound having a crosslinkable group crosslinking with the specific dichroic dye compound be contained, and it is more preferable that a plurality of the specific dichroic dye compounds be contained from the viewpoint of further curing of the coloring composition according to the invention.

The dichroic dye compound other than the specific dichroic dye compound is not particularly limited, and examples thereof include dichroic dye compounds described in paragraphs [0008] to [0026] of JP2013-227532A and paragraphs [0012] to [0029] of JP2013-109090A.

In addition, in a case where a polarizing element (polarizing plate) having good polarizing performance in the whole visible region is produced, the dichroic dye compound other than the specific dichroic dye compound is preferably a dye having a maximum absorption wavelength within a wavelength range of 380 to 550 nm. Examples of such a dichroic dye compound include dichroic dye compounds described in paragraphs [0005] to [0031] of JP2016-006502A, paragraphs [0067] to [0071] of JP2013-228706A, paragraphs [0012] to [0018] of JP2013-210624A, paragraphs [0008] to [0015] of JP2013-209367A, paragraphs [0016] to [0018] of JP1999-305036A (JP-H11-305036A), and paragraphs [0030] to [0069] of JP2011-215337A.

[Light Absorption Anisotropic Film]

The light absorption anisotropic film according to the invention is formed using the above-described coloring composition.

Examples of the method of manufacturing the light absorption anisotropic film according to the invention include a method including, in order, a step of forming a coating film by applying the coloring composition to a base (hereinafter, also referred to as "coating film forming step") and a step of aligning a liquid crystalline component contained in the light absorption anisotropic film (hereinafter, also referred to as "alignment step"). The liquid crystalline component refers to both the specific dichroic dye compound and the liquid crystalline compound.

Hereinafter, the method of manufacturing the light absorption anisotropic film will be described for each step.

<Coating Film Forming Step>

The coating film forming step is a step of forming a coating film by applying the coloring composition to a base.

By using a coloring composition containing the above-described solvent, or a liquid material such as a molten liquid obtained by heating the coloring composition, the coloring composition is easily applied to the base.

Examples of the method of applying the coloring composition include known methods such as a roll coating method, a gravure printing method, a spin coating method, a wire bar coating method, an extrusion coating method, a direct gravure coating method, a reverse gravure coating method, a die coating method, a spray method, and an ink jet method.

In this aspect, an example has been given in which the coloring composition is applied to the base, but the invention is not limited thereto. For example, the coloring composition may be applied to an alignment film provided on the base. Details of the alignment film will be described later.

<Alignment Step>

The alignment step is a step of aligning a liquid crystalline component contained in the coating film. Thus, a light absorption anisotropic film is obtained.

The alignment step may have a drying treatment. Through the drying treatment, a component such as a solvent can be removed from the coating film. The drying treatment may be performed by a method of leaving the coating film for a predetermined time at room temperature (for example, natural drying), or a heating and/or air blowing method.

Here, the liquid crystalline component contained in the coloring composition may be aligned by the above-described coating film forming step or drying treatment. For example, in an aspect in which the coloring composition is prepared as a coating liquid containing a solvent, the coating film is dried to remove the solvent from the coating film, and thus a coating film having light absorption anisotropy (that is, light absorption anisotropic film) is obtained.

A heating treatment to be described later may not be performed in a case where the drying treatment is performed at a temperature of not lower than a temperature at which the liquid crystalline component contained in the coating film transits to a liquid crystalline phase.

The temperature at which the liquid crystalline component contained in the coating film transits to a liquid crystalline phase is preferably 10° C. to 250° C., and more preferably 25° C. to 190° C. in view of manufacturing suitability or the like. The transition temperature is preferably 10° C. or higher since a cooling treatment or the like for lowering the temperature to a temperature range in which the liquid crystalline phase is exhibited is not required. In addition, the transition temperature is preferably 250° C. or lower since even in an isotropic liquid state with a temperature higher than the temperature range in which the liquid crystalline phase is exhibited, high temperature is not required, and thus the waste of thermal energy and the deformation, degeneration, or the like of the substrate can be reduced.

The alignment step preferably has a heating treatment. Accordingly, the liquid crystalline component contained in the coating film can be aligned, and thus the coating film after the heating treatment can be preferably used as a light absorption anisotropic film.

The heating treatment is preferably performed at 10° C. to 250° C., and more preferably at 25° C. to 190° C. in view of manufacturing suitability or the like. The heating time is preferably 1 to 300 seconds, and more preferably 1 to 60 seconds.

The alignment step may have a cooling treatment to be performed after the heating treatment. The cooling treatment is a treatment for cooling the coating film after the heating to about room temperature (20° C. to 25° C.). Accordingly, the alignment of the liquid crystalline component contained in the coating film can be fixed. The cooling means is not particularly limited, and the cooling can be performed by a known method.

By the above steps, a light absorption anisotropic film can be obtained.

In this aspect, examples of the method of aligning the liquid crystalline component contained in the coating film include the drying treatment and the heating treatment, but are not limited thereto, and a known alignment treatment can be used.

<Other Steps>

The method of manufacturing a light absorption anisotropic film may have a step of curing the light absorption anisotropic film (hereinafter, also referred to as "curing step") after the alignment step. Accordingly, a light absorption anisotropic film having excellent durability and curability is obtained.

For example, in a case where the light absorption anisotropic film has a crosslinkable group (polymerizable group), the curing step is performed by heating and/or light irradiation (exposure). Among these, light irradiation is preferably performed to conduct the curing step.

As the light source used for curing, various light sources can be used such as infrared rays, visible light, and ultraviolet rays, and ultraviolet rays are preferable. In the curing, ultraviolet rays may be applied during heating, or may be applied via a filter which transmits only a component with a specific wavelength.

In a case where the exposure is performed during heating, although depending on the temperature at which the liquid crystalline component contained in the light absorption anisotropic film transits to a liquid crystalline phase, the heating temperature during the exposure is preferably 25° C. to 140° C.

In addition, the exposure may be performed under a nitrogen atmosphere. In a case where the light absorption anisotropic film is cured by radical polymerization, inhibition of the polymerization by oxygen is reduced, and thus the exposure is preferably performed under a nitrogen atmosphere.

The film thickness of the light absorption anisotropic film is preferably 0.1 to 5.0 μm, and more preferably 0.3 to 1.5 μm. Although depending on the concentration of the dichroic dye compound in the coloring composition, a light absorption anisotropic film having an excellent absorbance is obtained in a case where the film thickness is 0.1 μm or greater, and a light absorption anisotropic film having an excellent transmittance is obtained in a case where the film thickness is 5.0 μm or less.

[Laminate]

A laminate according to the invention has a base and the light absorption anisotropic film formed on the base. The laminate according to the invention may further have a λ/4 plate formed on the light absorption anisotropic film.

In addition, the laminate according to the invention preferably has an alignment film between the base and the light absorption anisotropic film.

Hereinafter, the constituent layers of the laminate will be described.

<Base>

The base can be selected in accordance with usage of the light absorption anisotropic film, and examples thereof include glass and a polymer film. The light transmittance of the base is preferably 80% or greater.

In a case where a polymer film is used as the base, an optically isotropic polymer film is preferably used. As specific examples and preferable aspects of the polymer, those described in a paragraph [0013] of JP2002-22942A can be applied. In addition, even a conventionally known polymer such as polycarbonate or polysulfone in which birefringence is likely to be developed can also be used by reducing the developability through molecular modification described in WO00/26705A.

<Light Absorption Anisotropic Film>

Since the light absorption anisotropic film is as described above, the description thereof will be omitted.

<λ/4 Plate>

The "λ/4 plate" is a plate having a λ/4 function, and is specifically, a plate having a function of converting linearly polarized light with a specific wavelength into circularly polarized light (or converting circularly polarized light into linearly polarized light).

Specific examples of the λ/4 plate include US2015/0277006A.

For example, in an aspect in which the λ/4 plate has a single layer structure, specific examples of the plate include a retardation film in which an optically anisotropic layer having a λ/4 function is provided on a stretched polymer film or a support. In an aspect in which the λ/4 plate has a multilayered structure, specific examples of the plate include a broadband λ/4 plate having a laminate of a λ/4 plate and a λ/2 plate.

The λ/4 plate and the light absorption anisotropic film may be provided in contact with each other, or another layer may be provided between the λ/4 plate and the light absorption anisotropic film. Examples of the layer include a pressure sensitive layer and an adhesive layer.

<Alignment Film>

The laminate according to the invention may have an alignment film between the base and the light absorption anisotropic film.

As the alignment film, any layer may be used as long as it allows the liquid crystalline component contained in the coloring composition according to the invention to have a desired alignment state.

The alignment film can be provided by means of a rubbing treatment on the film surface with an organic compound (preferably a polymer), oblique vapor deposition of an inorganic compound, forming a layer having microgrooves, or accumulation of an organic compound (for example, ω-tricosanoic acid, dioctadecylmethylammonium chloride or methyl stearate) by the Langmure-Blogette method (LB film). Furthermore, there have been known alignment films having an aligning function imparted thereto by applying an electrical field, applying a magnetic field, or light irradiation. In the invention, among these, an alignment film formed by a rubbing treatment is preferable in view of easy control of a pretilt angle of the alignment film, and a photo-alignment film formed by light irradiation is also preferable in view of alignment uniformity.

(Rubbed Alignment Film)

The polymer material used for an alignment film formed by a rubbing treatment is described in many literatures, and many commercially available products are available. In the invention, polyvinyl alcohol or polyimide, or derivatives thereof can be preferably used. Regarding the alignment film, the description in the 24th line on page 43 to 8th line on page 49 in WO01/88574A1 can be referred to. The thickness of the alignment film is preferably 0.01 to 10 µm, and more preferably 0.01 to 1 µm.

(Photo-alignment Film)

The photo-alignment material used for an alignment film formed by light irradiation is described in many literatures. In the invention, preferable examples thereof include azo compounds described in JP2006-285197A, JP2007-76839A, JP2007-138138A, JP2007-94071A, JP2007-121721A, JP2007-140465A, JP2007-156439A, JP2007-133184A, JP2009-109831A, JP3883848B, and JP4151746B, aromatic ester compounds described in JP2002-229039A, maleimide and/or alkenyl-substituted nadimide compounds having photo-alignment units described in JP2002-265541A and JP2002-317013A, photocrosslinkable silane derivatives described in JP4205195B and JP4205198B, and photocrosslinkable polyimides, polyamides, and esters described in JP2003-520878A, JP2004-529220A, and JP4162850B. Azo compounds, photocrosslinkable polyimides, polyamides, and esters are more preferable.

To a photo-alignment film formed from the above-described material, linearly polarized light or unpolarized light is applied to manufacture a photo-alignment film.

In this specification, the "linearly polarized light irradiation" and the "unpolarized light irradiation" are operations for causing a photoreaction to the photo-alignment material. The wavelength of the light used is not particularly limited as long as the wavelength varies depending on the photo-alignment material used and is a wavelength necessary for the photoreaction. The peak wavelength of the light used for light irradiation is preferably 200 nm to 700 nm, and ultraviolet light having a light peak wavelength of 400 nm or less is more preferable.

The light source used for light irradiation is a usually used light source, and examples thereof include lamps such as a tungsten lamp, a halogen lamp, a xenon lamp, a xenon flash lamp, a mercury lamp, a mercury/xenon lamp, and a carbon arc lamp, various lasers [for example, a semiconductor laser, a helium/neon laser, an argon ion laser, a helium/cadmium laser, and an YAG (yttrium/aluminum/garnet) laser], light emitting diodes, and cathode ray tubes.

As means for obtaining linearly polarized light, a method using a polarizing plate (for example, an iodine polarizing plate, a dichroic dye polarizing plate, or a wire grid polarizing plate), a method using a prism-based element (for example, a GLAN-THOMSON prism) or a reflective polarizer using a BREWSTER angle, or a method using light emitted from a polarized laser light source can be employed. Only light having a necessary wavelength may be selectively applied by using a filter, a wavelength conversion element, or the like.

In a case where linearly polarized light is used as light for irradiation, a method of irradiating the alignment film with light from an upper surface or a rear surface in a direction vertical or oblique to the alignment film surface is employed. Although the incidence angle of the light varies depending on the photo-alignment material, the incidence angle is preferably 0° to 90° (vertical), and more preferably 40° to 90°.

In a case where unpolarized light is used, the alignment film is irradiated with unpolarized light from an oblique direction. The incidence angle of the light is preferably 10° to 80°, more preferably 20° to 60°, and even more preferably 30° to 50°.

The irradiation time is preferably 1 minute to 60 minutes, and more preferably 1 minute to 10 minutes.

In a case where patterning is required, a method of performing light irradiation using a photomask as many times as necessary for pattern formation, or a pattern writing method using laser beam scanning can be employed.

<Usage>

The laminate according to the invention can be used as a polarizing element (polarizing plate). For example, it can be used as a linearly polarizing plate or a circularly polarizing plate.

In a case where the laminate according to the invention has no optically anisotropic layer such as the λ/4 plate, the laminate can be used as a linearly polarizing plate. In a case where the laminate according to the invention has the λ/4 plate, the laminate can be used as a circularly polarizing plate.

[Image Display Device]

An image display device according to the invention has the above-described light absorption anisotropic film or the above-described laminate.

The display element used for the image display device according to the invention is not particularly limited, and examples thereof include a liquid crystal cell, an organic electroluminescence (hereinafter, abbreviated as "EL"), a display panel, and a plasma display panel.

Among these, a liquid crystal cell or an organic EL display panel is preferable, and a liquid crystal cell is more preferable. That is, as the image display device according to the invention, a liquid crystal display device using a liquid crystal cell as a display element, or an organic EL display device using an organic EL display panel as a display element is preferable, and a liquid crystal display device is more preferable.

<Liquid Crystal Display Device>

A liquid crystal display device as an example of the image display device according to the invention preferably has an aspect in which it has the above-described light absorption anisotropic film and a liquid crystal cell. More preferably, the liquid crystal display device has the above-described laminate (but including no λ/4 plate) and a liquid crystal cell.

In the invention, it is preferable that the light absorption anisotropic film (laminate) according to the invention be used as a polarizing element on the front side among light absorption anisotropic films (laminates) to be provided on both sides of a liquid crystal cell, and it is more preferable that the light absorption anisotropic film (laminate) according to the invention be used as polarizing elements on the front side and the rear side.

Hereinafter, the liquid crystal cell of the liquid crystal display device will be described in detail.

(Liquid Crystal Cell)

The liquid crystal cell used for the liquid crystal display device is preferably a vertical alignment (VA) mode, an optical compensated bend (OCB) mode, an in-plane-switching (IPS) mode, or a twisted nematic (TN) mode, but is not limited thereto.

In a TN mode liquid crystal cell, with no application of a voltage, rod-like liquid crystalline molecules are substantially horizontally aligned, and twist-aligned by 60° to 120°. The TN mode liquid crystal cell is most frequently used as a color thin film transistor (TFT) liquid crystal display device, and is described in many literatures.

In a VA mode liquid crystal cell, rod-like liquid crystalline molecules are substantially vertically aligned with no application of a voltage. The VA mode liquid crystal cell includes (1) a narrowly-defined VA mode liquid crystal cell in which rod-like liquid crystalline molecules are substantially vertically aligned with no application of a voltage, and are substantially horizontally aligned with the application of a voltage (described in JP1990-176625A (JP-H2-176625A)), (2) a (MVA mode) liquid crystal cell in which the VA mode is made into multi-domains in order to expand the viewing angle (described in SID97, Digest of tech. Papers (proceedings) 28 (1997) 845), (3) an (n-ASM mode) liquid crystal cell in which rod-like liquid crystalline molecules are substantially vertically aligned with no application of a voltage, and are twisted in multi-domains with the application of a voltage (described in the proceedings 58 and 59 of Japanese Liquid Crystal Conference (1998)), and (4) a SURVIVAL mode liquid crystal cell (announced at LCD internal 98). In addition, the VA mode liquid crystal cell may be any one of a patterned vertical alignment (PVA) type, an optical alignment type, and a polymer-sustained alignment (PSA) type. Details of these modes are described in JP2006-215326A and JP2008-538819A.

In an IPS mode liquid crystal cell, rod-like liquid crystalline molecules are substantially horizontally aligned with respect to a substrate, and the liquid crystalline molecules respond in a planar manner with the application of an electric field parallel to a substrate surface. The IPS mode displays a black image in a state in which no electric field is applied thereto, and the absorption axes of a pair of upper and lower polarizing plates are perpendicular to each other. A method of improving the viewing angle by reducing light leakage caused when a black image is displayed in an oblique direction using an optical compensation sheet is disclosed by JP1998-54982A (JP-H10-54982A), JP1999-202323A (JP-H11-202323A), JP1997-292522A (JP-H9-292522A), JP1999-133408A (JP-H11-133408A), JP1999-305217A (JP-H11-305217A), JP1998-307291A (JP-H10-307291A), and the like.

<Organic EL Display Device>

An organic EL display device as an example of the image display device according to the invention preferably has an aspect in which it has a light absorption anisotropic film, a λ/4 plate, and an organic EL display panel in this order from the visual recognition side.

More preferably, the organic EL display device has the above-described laminate having a λ/4 plate and an organic EL display panel in this order from the visual recognition side. In this case, the laminate has a base, an alignment film to be provided as necessary, a light absorption anisotropic film, and a λ/4 plate disposed in this order from the visual recognition side.

In addition, the organic EL display panel is a display panel configured using an organic EL element in which an organic light emitting layer (organic electroluminescence layer) is interposed between electrodes (between a cathode and an anode). The configuration of the organic EL display panel is not particularly limited, and a known configuration is employed.

EXAMPLES

Hereinafter, the invention will be more specifically described based on examples. Materials, used amounts, ratios, treatment contents, treatment procedures, and the like shown in the following examples are able to be properly changed without departing from the gist of the invention. Therefore, the scope of the invention will not be restrictively interpreted by the following examples.

[Synthesis of Dichroic Dye Compound]

A dichroic dye compound used for coloring compositions of the examples and the comparative examples was synthesized by the following route.

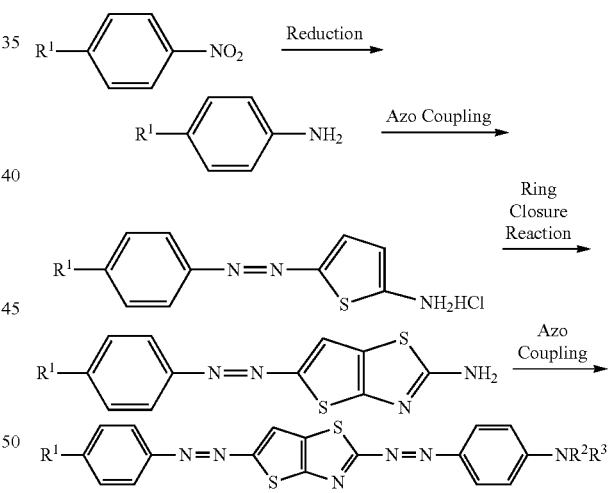

<Dichroic Dye Compound (D1)>

A dichroic dye compound (D1) was synthesized in accordance with the following steps.

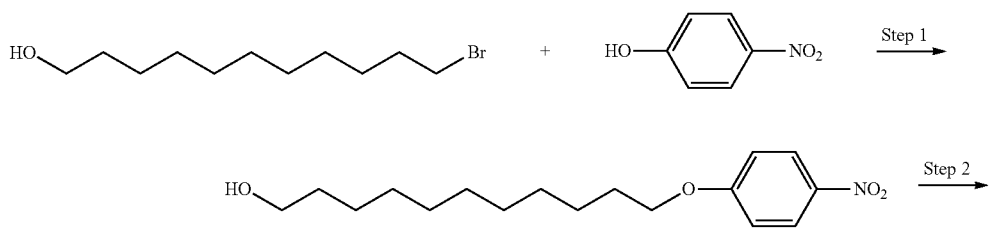

-continued

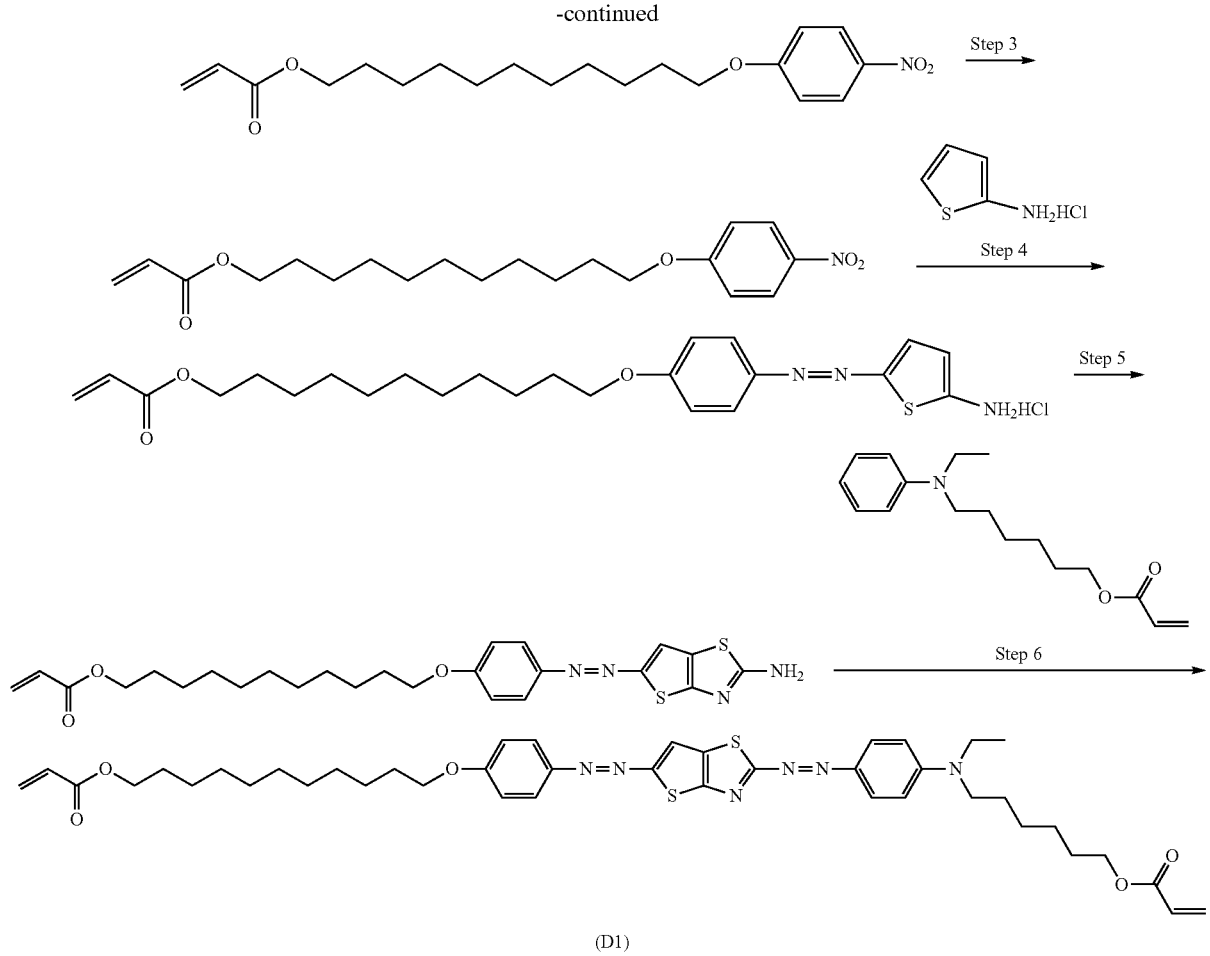

(D1)

(Steps 1 to 3)

27.8 g (200 mmol) of 4-nitrophenol, 50.2 g (200 mmol) of 11-bromoundecanol, and 30.4 g (220 mmol) of potassium carbonate were dissolved in 150 ml of N,N-dimethylacetamide (DMAc), and the resulting material was stirred for 2 hours at an external temperature of 105° C. The temperature was lowered to the room temperature, and liquid separation and washing were performed with ethyl acetate and an aqueous solution of 10% ammonium chloride. The organic layer was dried with magnesium sulfate, and then concentrated to obtain a white solid.

Next, 150 ml of DMAc was added to the solid and stirred in an ice bath. The temperature of the reaction system was maintained at 15° C. or lower, and 18.1 g of acrylic acid chloride was added dropwise. After the dropwise addition, the resulting material was stirred for 1 hour at room temperature. Ethyl acetate and an aqueous solution of 10% ammonium chloride were added thereto to perform liquid separation and washing. After drying with magnesium sulfate, the resulting material was concentrated, and a yellow solid (A) was obtained.

Separately, 89.4 g (1.6 mol) of a Fe powder, 8.9 g (166 mmol) of ammonium chloride, 210 ml of 2-propanol, and 88 ml of water were mixed and refluxed at an external temperature of 105° C. To the system in which the reflux had been performed, the yellow solid (A) dissolved by heating in 88 ml of 2-propanol was added dropwise. After the dropwise addition was terminated, the resulting material was reacted for 30 minutes under reflux. The temperature was lowered to the room temperature, and then the iron powder was removed by celite filtering. The filtrate was separated by ethyl acetate and water, and the organic layer was washed three times with water.

The organic layer was dried with sodium sulfate, and then concentrated. Purification was performed with columns, and 8.1 g of a target aniline derivative was obtained (yield of three steps: 12%).

NMR Data (DMSO-d6) δ: 1.20-1.38 (m, 14H), 1.50-1.70 (m, 4H), 4.20 (d, 2H), 3.80 (t, 2H), 4.00 (t, 2H), 4.50-4.70 (brs, 2H), 5.80-5.85 (d, 1H), 6.10-6.15 (dd, 1H), 6.38-6.43 (d, 1H), 6.50 (d, 2H), 6.60 (d, 2H)

(Step 4)

2-aminothiophene hydrochloride was synthesized from 2-nitrothiophene (manufactured by FUJIFILM Wako Pure Chemical Corporation) in accordance with a method described in the literature (Journal of Medicinal Chemistry, 2005, Vol. 48, page 5794).

6.0 g (17.9 mmol) of the aniline derivative obtained in the step 3 was added to a mixed liquid of 15 ml of 12 mol/L hydrochloric acid, 30 ml of water, and 30 ml of tetrahydrofuran (THF). Cooling was performed such that the internal temperature was 5° C. or lower, and 1.4 g of sodium nitrite (manufactured by FUJIFILM Wako Pure Chemical Corporation) was dissolved in 9 ml of water and added dropwise. Stirring was performed for 1 hour at an internal temperature of 5° C. or lower, and a diazonium solution was prepared.

Next, 2.4 g (17.9 mmol) of 2-aminothiophene hydrochloride was dissolved in 12 ml of water and 6 ml of a hydrochloric acid, and the diazonium solution prepared as described above was added dropwise thereto at an internal temperature of 0° C. The reaction liquid was heated to the room temperature and stirred for 2 hours.

The precipitated solid was filtered and dried, and 6.5 g of a target orange solid was obtained.

NMR Data (DMSO-d6) δ: 1.20-1.38 (m, 14H), 1.50-1.70 (m, 4H), 4.20 (d, 2H), 3.90 (t, 2H), 4.00 (t, 2H), 5.80-5.85 (d, 1H), 6.10-6.15 (dd, 1H), 6.38-6.43 (d, 1H), 6.78 (s, 1H), 7.00 (d, 2H), 7.42 (d, 2H), 7.85 (s, 1H)

(Step 5)

6.0 g (12.4 mmol) of the orange solid obtained in the step 4 was dissolved by suspension in 100 ml of an acetic acid, and 1.5 g (18.6 mmol) of sodium thiocyanate was added thereto at room temperature. 2.0 g (24.8 mmol) of bromine was added dropwise while water cooling was performed and the internal temperature was maintained at 20° C. or lower.

The resulting material was stirred for 2 hours at room temperature, and then 100 ml of water was added thereto. The obtained solid was filtered and dried, and 6.1 g of a target black solid was obtained.

NMR Data (DMSO-d6) δ: 1.20-1.38 (m, 14H), 1.50-1.70 (m, 4H), 4.00-4.20 (t×2, 4H), 5.90-5.95 (d, 1H), 6.10-6.15 (dd, 1H), 6.38-6.43 (d, 1H), 6.78 (s, 1H), 7.00 (d, 2H), 7.60-7.70 (d, 2H), 7.90 (s, 1H), 8.10 (brs, 2H)

(Step 6)

5.0 g (10.0 mmol) of the black solid obtained in the step 5 was added to 6 ml of a hydrochloric acid and 6 ml of an acetic acid, and 5 ml of an aqueous solution of 0.72 g (10.5 mmol) sodium nitrite was added dropwise at 0° C. or lower under ice cooling. After stirring for 1 hour, 0.52 mg of an amidosulfuric acid was added, and a diazonium solution was obtained.

While 10 ml of a methanol solution of 2.8 g N-ethyl-N-(6-acryloyloxyhexyl)aniline was kept at 0° C. or lower, the diazonium solution was added dropwise thereto. The temperature was raised to the room temperature, and stirring was performed for 1 hour. Then, 30 ml of water was added to filter the obtained solid. Purification was performed with columns, and 0.51 g of a compound of a dark purple solid represented by Formula (D1) was obtained.

N-ethyl-N-(6-acryloyloxyhexyl)aniline was synthesized in accordance with U.S. Pat. No. 7,601,849A and known methods using N-ethylaniline as a raw material.

NMR Data (CDCl3) δ: 1.20-1.50 (m, 21H), 1.60-1.90 (m, 8H), 3.40 (t, 2H), 3.50 (t, 2H), 4.05 (t, 2H), 4.10 (t, 2H), 4.20 (t, 2H), 5.80-5.85 (d, 2H), 6.10-6.15 (dd, 2H), 6.38-6.43 (d×2, 2H), 6.70 (d, 2H), 7.00 (d, 2H), 7.82 (s, 1H), 7.88 (d, 2H), 7.95 (d, 2H)

The HSP value of the obtained dichroic dye compound (D1) was calculated using software for Hansen solubility parameter calculation (HSPiP ver. 4.1.07). The HSP value of the dichroic dye compound (D1) was 24.8. The HSP value of each of dichroic dye compounds and liquid crystalline compounds to be described later was also calculated in the same manner.

(D1)

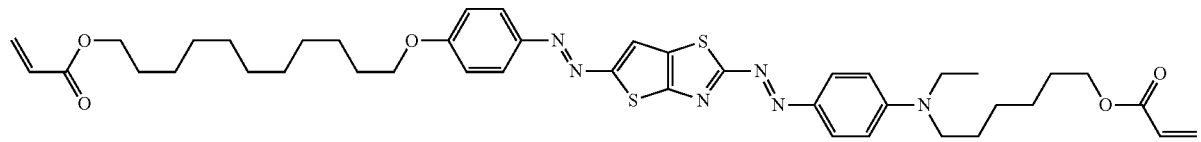

<Dichroic Dye Compound (D2)>

The coupling was performed in the same manner, except that N-ethyl-N-(2-acryloyloxyethyl)aniline was used instead of N-ethyl-N-(6-acryloyloxyhexyl)aniline during the second coupling of the dichroic dye compound (D1).

NMR Data (CDCl3) δ: 0.95 (t, 3H), 1.20-1.50 (m, 14H), 1.60-1.70 (m, 2H), 1.80-1.90 (m, 2H), 3.60 (q, 2H), 3.80 (t, 2H), 4.05 (t, 2H), 4.15 (t, 2H), 4.40 (t, 2H), 5.80 (d, 1H), 5.88 (d, 1H), 6.10-6.15 (dd, 2H), 6.38 (d, 1H), 6.43 (d, 1H), 6.80 (d, 2H), 7.00 (d, 2H), 7.82 (s, 1H), 7.88 (d, 2H), 7.95 (d, 2H)

The HSP value of the obtained dichroic dye compound (D2) was 22.6.

(D2)

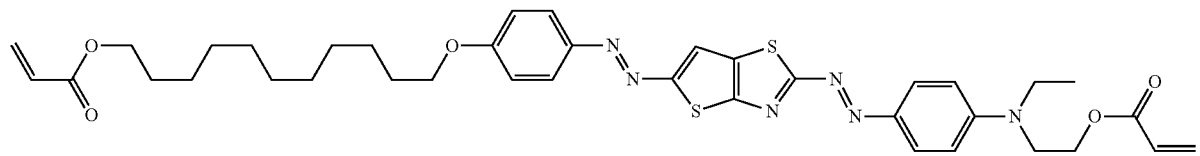

<Dichroic Dye Compound (D3)>

The coupling was performed in the same manner, except that N-ethyl-N-(2-acryloyloxyethyl)-m-toludine was used instead of N-ethyl-N-(2-acryloyloxyethyl)aniline during the second coupling of the dichroic dye compound (D2).

NMR Data (CDCl3) δ: 0.95 (t, 3H), 1.20-1.50 (m, 14H), 1.60-1.70 (m, 2H), 1.80-1.90 (m, 2H), 2.70 (s, 3H), 3.60 (q, 2H), 3.80 (t, 2H), 4.05 (t, 2H), 4.15 (t, 2H), 4.40 (t, 2H), 5.80 (d, 1H), 5.88 (d, 1H), 6.10-6.15 (dd, 2H), 6.38 (d, 1H), 6.43 (d, 1H), 6.60-6.70 (m, 2H), 7.00 (d, 2H), 7.82 (s, 1H), 7.88 (d, 2H), 8.00 (d, 1H)

The HSP value of the obtained dichroic dye compound (D3) was 22.3.

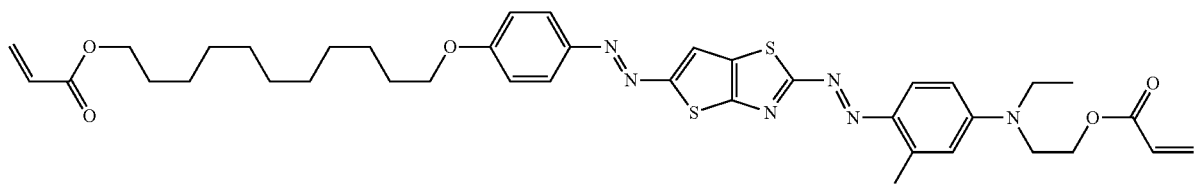

(D3)

<Dichroic Dye Compound (D4)>

An aniline derivative was synthesized by a known method using 4-nitrophenethyl alcohol as a starting material, and then a dichroic dye compound (D4) was synthesized in the same manner as in the case of the dichroic dye compound (D1).

NMR Data (CDCl$_3$) δ: 1.25 (t, 3H), 1.45 (brs, 4H), 1.70-1.73 (m, 4H), 3.06-3.08 (t, 2H), 3.42 (t, 2H), 3.51-3.53 (t, 2H), 4.16-4.19 (t, 2H), 4.41-4.44 (t, 2H), 5.83 (d, 2H), 6.10-6.15 (dd, 2H), 6.38 (d, 2H), 6.71-6.74 (d, 2H), 7.25 (d, 2H), 7.82-7.84 (d, 2H), 7.92-7.95 (s×1, d×1, 3H)

The HSP value of the obtained dichroic dye compound (D4) was 18.1.

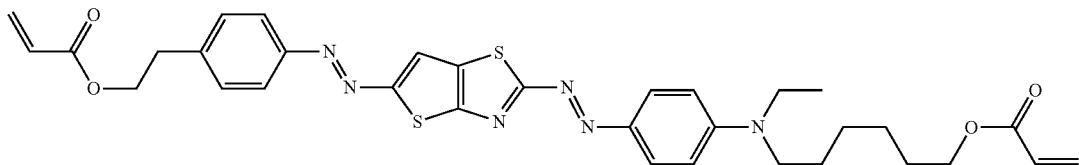

(D4)

<Dichroic Dye Compound (D5)>

An aniline derivative was synthesized by a known method using 4-nitrobenzoate as a starting material, and then the synthesis was performed up to the ring closure reaction in the same manner as in the case of the dichroic dye compound (D1). Then, the coupling was performed using N,N-diethylaniline instead of N-ethyl-N-(6-acryloyloxyhexyl) aniline of (D4), and thus a dichroic dye compound (D5) was obtained.

NMR Data (CDCl$_3$) δ: 1.20-1.40 (m, 9H), 1.65 (d, 3H), 3.40-3.60 (q, 4H), 4.20-4.30 (q, 2H), 5.40-5.45 (q, 1H), 6.70-6.80 (d, 2H), 7.90-8.00 (m, 4H), 8.00 (s, 1H), 8.20 (d, 2H)

The HSP value of the obtained dichroic dye compound (D5) was 21.7.

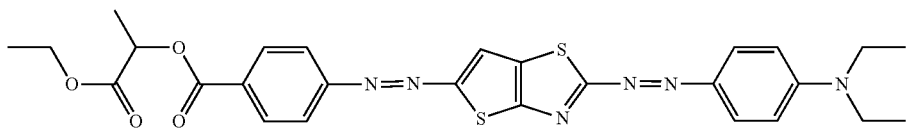

(D5)

<Dichroic Dye Compound (D6)>

A dichroic dye compound (D6) was synthesized in the same manner as in the case of the dichroic dye compound (D1) using 4-dodecylaniline as an aniline derivative.

NMR Data (CDCl$_3$) δ: 0.86-0.89 (t, 3H), 1.26-1.32 (m, 24H), 1.60-1.70 (t, 2H), 2.67-2.70 (t, 2H), 3.49-3.54 (q, 4H), 6.73-6.76 (d, 2H), 7.28-7.31 (d, 2H), 7.81 (d, 2H), 7.90-7.95 (s×1, d×1, 3H)

The HSP value of the obtained dichroic dye compound (D6) was 17.0.

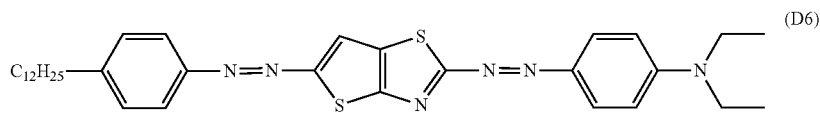
(D6)

<Dichroic Dye Compound (D7)>

An aniline derivative was synthesized by a known method using 4-nitrophenethyl alcohol as a starting material, and then a dichroic dye compound (D7) was synthesized in the same manner as in the case of the dichroic dye compound (D2).

NMR Data (CDCl$_3$) δ: 0.84-0.88 (t, 3H), 1.10-1.12 (t, 31-1), 1.27-1.30 (t, 3H), 1.40-1.70 (m, 2H), 2.30-2.40 (m, 1H), 3.02-3.04 (t, 2H), 3.57-3.59 (q, 2H), 3.77 (t, 2H), 4.33 (t, 2H), 4.40 (t, 2H), 5.86 (d, 1H), 6.10-6.15 (dd, 1H), 6.40 (d, 1H), 6.83 (d, 2H), 7.36 (d, 2H), 7.82 (d, 2H), 7.88 (d, 2H), 7.93-8.00 (s×1, d×1, 3H)

The HSP value of the obtained dichroic dye compound (D7) was 18.0.

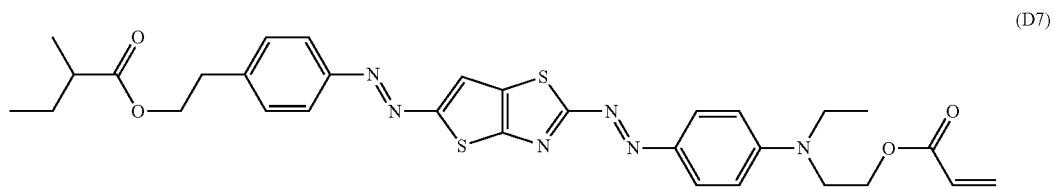 [SMILES: C=CC(=O)OCCN(CC)c1ccc(/N=N/c2nc3sc(/N=N/c4ccc(CCOC(=O)C(C)CC)cc4)cc3s2)cc1]
(D7)

Example 1

A light absorption anisotropic film produced using a coloring composition of Example 1 to be described later was produced on an alignment film produced as described below.

<Production of Alignment Film>

A glass base (manufactured by Central Glass Co., Ltd., blue plate glass, size: 300 mm×300 mm, thickness: 1.1 mm) was washed with an alkaline detergent, and then pure water was poured thereto. After that, the glass base was dried.

The following alignment film forming composition 1 was applied to the glass base after the drying using a bar #12, and the applied alignment film forming composition 1 was dried for 2 minutes at 110° C. to form a coating film on the glass base.

The obtained coating film was subjected to a rubbing treatment (number of rotations of roller: 1,000 rotations/2.9 mm, stage speed: 1.8 m/min) once to form an alignment film on the glass base.

| Composition of Alignment Film Forming Composition 1 | |
|---|---|
| Modified Vinyl Alcohol (see Formula (PVA-1)) | 2.00 parts by mass |
| Water | 74.08 parts by mass |
| Methanol | 23.86 parts by mass |
| Photopolymerization Initiator (IRGACURE 2959, manufactured by BASF SE) | 0.06 parts by mass |

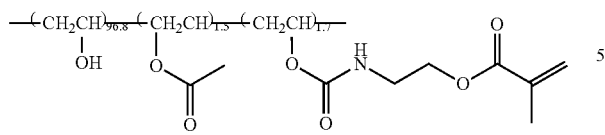

(PVA-1)

The numerical value assigned to the repeating unit in Formula (PVA-1) represents a molar ratio of each repeating unit.

<Production of Light Absorption Anisotropic Film>

The obtained alignment film was spin-coated with a coloring composition of Example 1 (see the following composition) by using a spin coater at a rotation speed of 1,000 rotations/10 sec. Then, drying was performed for 30 seconds at room temperature to form a coating film on the alignment film. Next, the obtained coating film was heated for 15 seconds at 180° C., and then cooled to the room temperature to produce a light absorption anisotropic film of Example 1 on the alignment film.

| Composition of Coloring composition of Example 1 | |
|---|---|
| Liquid Crystalline Compound (A) (see Formula (A)) | 4.81 parts by mass |
| Above Dichroic Dye Compound (D1) | 1.69 parts by mass |
| Interface Improver F1 (see Formula (F1)) | 0.04 parts by mass |
| Cyclopentanone (solvent) | 93.46 parts by mass |

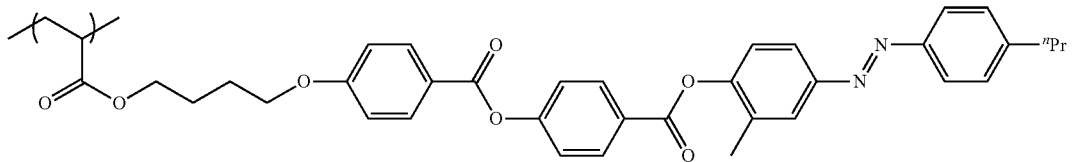

(A)

In Formula (A), "$^n$Pr" represents an n-propyl group.
The HSP value of the liquid crystalline compound (A) was 21.7.

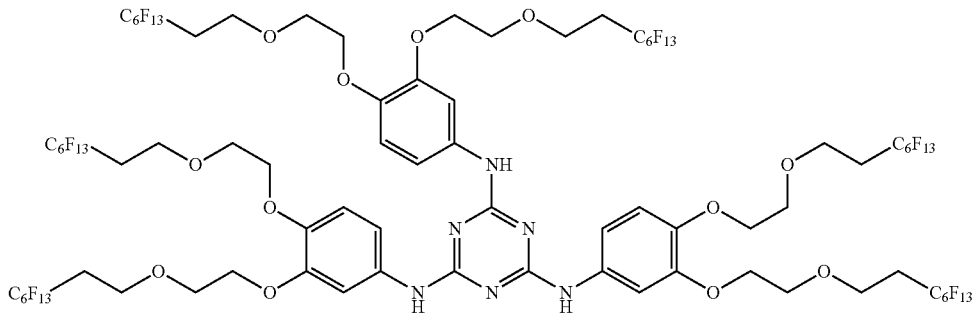

(F1)

Examples 2 to 6

Light absorption anisotropic films of Examples 2 to 6 were produced in the same manner as in Example 1, except that coloring compositions of Examples 2 to 6 were used.

Here, the coloring compositions of Examples 2 to 6 have the same composition as the coloring composition of Example 1, except that in addition to the dichroic dye compound (D1) contained in the coloring composition of Example 1, the dichroic dye compound (D2) is used in Example 2, the dichroic dye compound (D3) is used in Example 3, the dichroic dye compound (D4) is used in Example 4, the dichroic dye compound (D5) is used in Example 5, and the dichroic dye compound (D7) is used in Example 6.

Example 7

A light absorption anisotropic film of Example 7 was produced in the same manner as in Example 1, except that a coloring composition of Example 7 was used.

Here, the coloring composition of Example 7 has the same composition as the coloring composition of Example 1, except that in addition to the liquid crystalline compound (A) contained in the coloring composition of Example 1, the following liquid crystalline compound (B) is used.

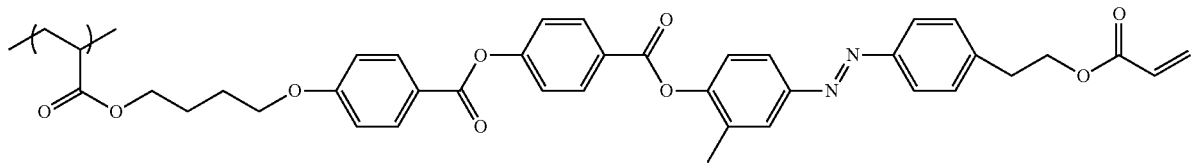

(B)

The HSP value and the number average molecular weight of the liquid crystalline compound (B) were 22.2 and 10,521, respectively.

Comparative Example 1

A light absorption anisotropic film of Comparative Example 1 was produced in the same manner as in Example 1, except that a coloring composition of Comparative Example 1 was used.

Here, the coloring composition of Comparative Example 1 has the same composition as the coloring composition of Example 1, except that in addition to the dichroic dye compound (D1) contained in the coloring composition of Example 1, the dichroic dye compound (D6) is used.

Comparative Example 2

A light absorption anisotropic film of Comparative Example 2 was produced in the same manner as in Example 1, except that a coloring composition of Comparative Example 2 was used.

Here, the coloring composition of Comparative Example 2 has the same composition as the coloring composition of Example 7, except that in addition to the dichroic dye compound (D1) contained in the coloring composition of Example 7, the dichroic dye compound (D6) is used.

[Evaluation Test]
<Dichroic Ratio>

In a state in which a linear polarizer was inserted on the light source side of an optical microscope (manufactured by Nikon Corporation, product name "ECLIPS E600 POL"), the light absorption anisotropic film of each of the examples and the comparative examples was set on a sample table, and using a multi-channel spectroscope (manufactured by Ocean Optics, Inc., product name "QE65000"), an absorbance of the light absorption anisotropic film in a wavelength band of 500 to 700 nm was measured to calculate a dichroic ratio by the following formula.

$$\text{Dichroic Ratio } (D0) = Az0/Ay0$$

In the above formula, "Az0" represents an absorbance with respect to the polarization in an absorption axis direction of the light absorption anisotropic film. "Ay0" represents an absorbance with respect to the polarization in a polarization axis direction of the light absorption anisotropic film.

[Evaluation Results]

The results of the above evaluation test are shown in Table 1. In the following table, the "difference in HSP value" represents an absolute value (|HSP2-HSP1|) of the difference between the HSP value (HSP1) of the dichroic dye compound and the HSP value (HSP2) of the liquid crystalline compound.

TABLE 1

| | Dichroic Dye Compound | | Liquid Crystalline Compound | | Absolute Value of Difference in HSP Value \| HSP2 − HSP1 \| | Evaluation Results Dichroic Ratio |
|---|---|---|---|---|---|---|
| | Kind | HSP Value (HSP1) | Kind | HSP Value (HSP2) | | |
| Example 1 | (D1) | 24.8 | (A) | 21.7 | 3.1 | 39 |
| Example 2 | (D2) | 22.6 | (A) | 21.7 | 0.9 | 33 |
| Example 3 | (D3) | 22.3 | (A) | 21.7 | 0.6 | 30 |
| Example 4 | (D4) | 18.1 | (A) | 21.7 | 3.6 | 34 |
| Example 5 | (D5) | 21.7 | (A) | 21.7 | 0 | 24 |
| Example 6 | (D7) | 18.0 | (A) | 21.7 | 3.7 | 25 |
| Example 7 | (D1) | 24.8 | (B) | 22.2 | 2.6 | 32 |
| Comparative Example 1 | (D6) | 17.0 | (A) | 21.7 | 4.7 | 18 |
| Comparative Example 2 | (D6) | 17.0 | (B) | 22.2 | 5.2 | 15 |

As shown in Table 1, it was found that a light absorption anisotropic film having an excellent dichroic ratio is obtained in a case where the Hansen solubility parameter is 17.5 or greater and a coloring composition containing a dichroic dye compound having a structure represented by Formula (1) is used (Examples 1 to 7).

In addition, from the comparison between Examples 1 to 7, it was found that a light absorption anisotropic film having a more excellent dichroic ratio is obtained in a case where a coloring composition containing a dichroic dye compound in which at least one $L^3$ or $L^4$ in Formula (2) is a crosslinkable group is used (Examples 1 to 4, 6, and 7).

In addition, from the comparison between Examples 4 and 6, it was found that a light absorption anisotropic film having a more excellent dichroic ratio is obtained in a case where a coloring composition containing a dichroic dye compound in which both $L^3$ and $L^4$ in Formula (2) are crosslinkable groups is used (Example 4).

Comparative Examples 1 and 2 show that the dichroic ratio of the light absorption anisotropic film deteriorates in a case where a coloring composition containing a dichroic dye compound having a structure represented by Formula (1), but having a Hansen solubility parameter of less than 17.5 is used.

What is claimed is:

1. A coloring composition comprising:
    a dichroic dye compound which has a Hansen solubility parameter of 17.5 or greater and has a structure represented by Formula (2); and
    a liquid crystalline compound,

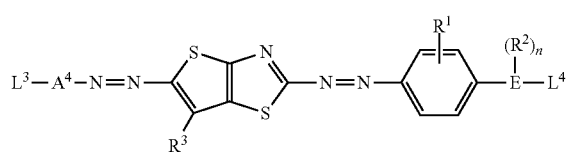

(2)

in Formula (2), $A^4$ represents a divalent aromatic group which may have a substituent,
    in Formula (2), E represents any one of a nitrogen atom, an oxygen atom, and a sulfur atom,
    in Formula (2), $R^1$ represents any one group or atom of a hydrogen atom, a halogen atom, an alkyl group which may have a substituent, and an alkoxy group which may have a substituent,
    in Formula (2), $R^2$ represents a hydrogen atom or an alkyl group which may have a substituent,
    in Formula (2), $R^3$ represents a hydrogen atom or a substituent,
    in Formula (2), n represents 0 or 1, in a case where E is a nitrogen atom, n is 1, and in a case where E is an oxygen atom or a sulfur atom, n is 0, and
    wherein in Formula (2), both $L^3$ and $L^4$ are a crosslinkable group, wherein the crosslinkable group is an acryloyl group or a methacryloyl group.

2. The coloring composition according to claim 1, wherein in Formula (2), $A^4$ is a phenylene group.

3. The coloring composition according to claim 1, wherein an absolute value of a difference between a Hansen solubility parameter of the dichroic dye compound and a Hansen solubility parameter of the liquid crystalline compound is greater than 0 and not greater than 4.5.

4. A dichroic dye compound which has a Hansen solubility parameter of 17.5 or greater and has a structure represented by Formula (2),

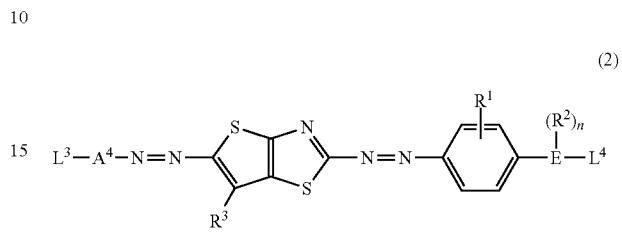

(2)

in Formula (2), $A^4$ represents a divalent aromatic group which may have a substituent,
    in Formula (2), E represents any one of a nitrogen atom, an oxygen atom, and a sulfur atom,
    in Formula (2), $R^1$ represents any one group or atom of a hydrogen atom, a halogen atom, an alkyl group which may have a substituent, and an alkoxy group which may have a substituent,
    in Formula (2), $R^2$ represents a hydrogen atom or an alkyl group which may have a substituent,
    in Formula (2), $R^3$ represents a hydrogen atom or a substituent,
    in Formula (2), n represents 0 or 1, in a case where E is a nitrogen atom, n is 1, and in a case where E is an oxygen atom or a sulfur atom, n is 0, and
    wherein in Formula (2), both $L^3$ and $L^4$ are a crosslinkable group, wherein the crosslinkable group is an acryloyl group or a methacryloyl group.

5. The dichroic dye compound according to claim 4, wherein in Formula (2), $A^4$ is a phenylene group.

6. A light absorption anisotropic film which is formed using the coloring composition according to claim 1.

7. A laminate comprising:
    a base; and
    the light absorption anisotropic film according to claim 6 which is formed on the base.

8. The laminate according to claim 7, further comprising:
    a λ/4 plate which is formed on the light absorption anisotropic film.

9. An image display device comprising:
    the light absorption anisotropic film according to claim 6.

10. An image display device comprising:
    the laminate according to claim 7.

* * * * *